US012515990B2

(12) United States Patent
Vitale et al.

(10) Patent No.: US 12,515,990 B2
(45) Date of Patent: Jan. 6, 2026

(54) METHOD FOR CONSTRUCTING SCIENTIFICALLY ENGINEERED AND CONSTRUCTED UNPAVED RUNWAYS (71) Applicant: MIDWEST INDUSTRIAL SUPPLY, INC., Canton, OH (US)

(72) Inventors: Robert W. Vitale, Canton, OH (US); Matthew Lyons, Medina, OH (US); Matthew Mefford, Akron, OH (US); Maurice Fenelon, Thunder Bay (CA); Gina Greenlee, Canton, OH (US)

(73) Assignee: MIDWEST INDUSTRIAL SUPPLY, INC., Canton, OH (US)

( * ) Notice: Subject to any disclaimer, the term of this patent is extended or adjusted under 35 U.S.C. 154(b) by 0 days.

(21) Appl. No.: 18/752,168

(22) Filed: Jun. 24, 2024

(65) Prior Publication Data
US 2024/0343649 A1    Oct. 17, 2024

Related U.S. Application Data (63) Continuation-in-part of application No. 18/190,414, filed on Mar. 27, 2023, now Pat. No. 12,017,958, (Continued)

(51) Int. Cl.
*E01C 7/36* (2006.01)
*C04B 24/12* (2006.01)
(Continued)

(52) U.S. Cl.
CPC ......... *C04B 26/045* (2013.01); *C04B 24/121* (2013.01); *E01C 7/36* (2013.01);
(Continued)

(58) Field of Classification Search
CPC ........... E01C 13/065; C04B 2103/0075; C04B 2111/00741; C04B 2111/0075; C04B 2111/10
(Continued)

(56) References Cited

U.S. PATENT DOCUMENTS

| 1,409,104 A | 3/1922 | Henderson |
| 1,955,421 A | 4/1934 | Hayden |

(Continued)

FOREIGN PATENT DOCUMENTS

| CA | 2402162 C | 8/2009 |
| CA | 2584189 C | 6/2012 |

(Continued)

*Primary Examiner* — Raymond W Addie
(74) *Attorney, Agent, or Firm* — Emerson, Thomson & Bennett, LLC; Daniel A. Thomson (57) ABSTRACT

Methods and compositions for the installation of scientifically engineered and constructed unpaved runways are disclosed herein. The compositions are heterogeneous mixtures produced by blending aliphatic or cyclic organic compounds with binders that chemically react with gravel, aggregate, and soil particles to create permanent bonds, resulting in a strengthened and stabilized surface. When blended into the aggregate of a runway surface, the organic compounds act as a carrier fluid, distributing the binder system evenly so particles of all sizes are thoroughly and uniformly coated with the composition. Once the composition is distributed, an adhesion promoting compound reacts with constituents in the aggregate to increase the formation and strength of chemical bonds between particles.

15 Claims, 4 Drawing Sheets

Related U.S. Application Data which is a continuation of application No. 17/393,513, filed on Aug. 4, 2021.

(51) Int. Cl.
  *C04B 26/04* (2006.01)
  *E01C 13/06* (2006.01)
  *C04B 103/00* (2006.01)
  *C04B 111/00* (2006.01)
  *C04B 111/10* (2006.01)

(52) U.S. Cl.
  CPC .... *E01C 13/065* (2013.01); *C04B 2103/0075* (2013.01); *C04B 2111/00741* (2013.01); *C04B 2111/0075* (2013.01); *C04B 2111/10* (2013.01)

(58) Field of Classification Search
  USPC .......................................... 404/17–20, 72–75
  See application file for complete search history.

(56) References Cited

U.S. PATENT DOCUMENTS

| | | | |
|---|---|---|---|
| 2,346,930 A | 4/1944 | Long | |
| 2,535,644 A | 12/1950 | Martin | |
| 2,768,089 A | 10/1956 | Erickson | |
| 2,937,581 A | 5/1960 | Havelin | |
| 3,084,058 A | 4/1963 | Hemwall | |
| 3,518,924 A | 7/1970 | Gray | |
| 3,817,643 A | 6/1974 | Azar | |
| 4,113,401 A | 9/1978 | McDonald | |
| 4,836,856 A | 6/1989 | Klco | |
| 5,082,393 A | 1/1992 | Ringesten | |
| 5,362,176 A | 11/1994 | Sovik | |
| 5,378,079 A | 1/1995 | Omann | |
| 5,820,302 A | 10/1998 | Roberts | |
| 6,558,081 B2 | 5/2003 | Hull | |
| 6,623,207 B2 | 9/2003 | Grubba | |
| 7,086,806 B2 | 8/2006 | Rickards | |
| 7,279,035 B2 | 10/2007 | Barnat | |
| 7,845,879 B2 | 12/2010 | Maier | |
| 7,878,731 B2 | 2/2011 | Maier | |
| 7,918,624 B2 | 4/2011 | Blacklidge | |
| 7,946,787 B2 | 5/2011 | Glee | |
| 8,348,547 B2 | 1/2013 | Quackenboss | |
| 8,419,312 B2 | 4/2013 | Vitale | |
| 8,702,343 B1 * | 4/2014 | Vitale | E01C 3/04 404/19 |
| 8,814,464 B2 * | 8/2014 | McDade | E01C 19/48 404/36 |
| 8,814,465 B2 | 8/2014 | Vitale et al. | |
| 9,637,870 B1 | 5/2017 | Coe | |
| 10,351,760 B2 * | 7/2019 | Schultheiss | C09K 8/035 |
| 2003/0223814 A1 | 12/2003 | Peltz | |
| 2004/0245494 A1 | 12/2004 | Horman et al. | |
| 2005/0120621 A1 * | 6/2005 | Lawson | C10L 1/026 44/388 |
| 2010/0047015 A1 | 2/2010 | Takamura | |
| 2010/0129152 A1 | 5/2010 | Taylor | |
| 2012/0051839 A1 | 3/2012 | Begley | |
| 2012/0128419 A1 | 5/2012 | Menzenbach | |
| 2012/0207551 A1 * | 8/2012 | Guilbault | C09K 17/36 523/132 |
| 2012/0328377 A1 * | 12/2012 | Brenneis | C04B 26/12 523/130 |
| 2013/0011195 A1 | 1/2013 | Bower | |
| 2013/0045049 A1 | 2/2013 | Krzyzak | |
| 2014/0109476 A1 | 4/2014 | Kyrsiak | |
| 2014/0140767 A1 | 5/2014 | Vitale et al. | |
| 2014/0186117 A1 * | 7/2014 | Vitale | C04B 26/06 524/60 |
| 2014/0270953 A1 | 9/2014 | Duffy | |
| 2014/0369749 A1 | 12/2014 | Friedman et al. | |
| 2015/0119301 A1 * | 4/2015 | McDaniel | E21B 43/267 507/224 |
| 2015/0147117 A1 | 5/2015 | Weaver | |
| 2016/0002473 A1 | 1/2016 | Yildirim | |
| 2017/0145640 A1 | 5/2017 | Coe | |
| 2017/0218247 A1 * | 8/2017 | Sonnenschein | C09K 8/467 |
| 2017/0218574 A1 | 8/2017 | Coe | |
| 2018/0134949 A1 * | 5/2018 | Monastiriotis | C09K 8/52 |

FOREIGN PATENT DOCUMENTS

| | | | |
|---|---|---|---|
| CA | 2796740 C | 1/2017 | |
| DE | 202008018615 U1 * | 9/2016 | ........ E02D 17/202 |

\* cited by examiner

Untreated Surface Coarse Aggregate

FIG. 3A

After Incorporating SECUR 35 System and Compaction

FIG. 3B

After 30 Day Maturation of SECUR 35 System

FIG. 3C

1 Year Post Installation

FIG. 3D

3 Years Post Installation

FIG. 3E

5 Years Post Installation

METHOD FOR CONSTRUCTING SCIENTIFICALLY ENGINEERED AND CONSTRUCTED UNPAVED RUNWAYS

This application is a continuation-in-part of U.S. Ser. No. 18/190,414, filed Mar. 27, 2023, now U.S. Pat. No. 12,017,958, which is a continuation of U.S. Ser. No. 17/393,513, filed Aug. 4, 2021, the contents of which are incorporated herein by reference. The present teaching relates to a method and composition for constructing unpaved runways and other trafficked surfaces.

I. BACKGROUND

Currently there are three widely accepted categories of runways based on their surface type and construction. Flexible Pavement Runways—A runway that is surfaced with a mixture of asphaltic or materials (asphalt and aggregate) from 3-5 inches or more in thickness. This pavement is designed so each structural layer is supported by the layer below and ultimately by the subgrade. Rigid Pavement Runways—A runway constructed from cement concrete or reinforced concrete slabs. This pavement is based on providing a structural cement concrete slab of sufficient strength to resist the loads from traffic and does not rely on underlying pavement layers to support the load. Unpaved or Gravel Runways—A runway with an unpaved surface constructed from a pavement with an unbound granular surface composed of gravel, aggregate, sand, clay, crushed stone, or other soil materials.

Remote unpaved runways and their operators face a multitude of unique issues due to their climate, geographic location, available resources, and performance requirements.

One of these issues is the risk of damage to an aircraft resulting from foreign object debris (FOD) striking the fuselage, propellors, and other components or being ingested into its engines. A gravel kit is a modification on an aircraft to avoid FOD damage or ingestion while operating on unpaved surfaces. These modifications generally include methods of preventing damage to the engines, underside of the fuselage and the wings. Gravel kits are vital to protecting aircraft from FOD damage, keeping pilots safe and avoiding costly repairs. However, in recent decades, aircraft manufacturers have discontinued the installation of gravel kits and phased out older aircraft equipped with gravel kits. As new aircraft are being introduced to these remote runways, the need to eliminate FOD and its associated hazards has become essential to these remote unpaved runways and other trafficked surfaces. In addition to phasing out gravel kits, aircraft manufacturers generally do not provide warranties for aircraft operating on unpaved gravel runways leaving the burden on the airlines and runway owners. Airlines and runway owners can be responsible for hundreds of thousands of dollars in aircraft repairs annually if the issue of FOD is not effectively addressed.

Due to the remote locations of most of the unsurfaced, gravel runway airports, the cost of runway construction can be extremely expensive. Acquiring quality aggregate is a costly and logistically complicated process because most locations are only accessible by air or water and do not have a network of all season roads connecting the runway and nearby villages to the rest of the state or province. Due to this, typically aggregate must be barged to the site, or a crusher must be transported and installed to produce aggregate onsite during the winter road season and the equipment demobilized out before the spring thaw. Both options are very costly. For a larger aircraft, such as a Boeing 737, an untreated unpaved runway can lose 3.5 to 9 tons of aggregate with each plane movement. Minimizing and preventing the loss of the existing runway aggregate is of utmost importance for reducing the life cycle costs of remote unpaved runways and other trafficked surfaces and keeping them operationally safe.

The cold climate in which most unpaved runways and other trafficked surfaces are located creates additional issues and limits the products/chemistries that can be used for surface treatment, stabilization and dust control. The reduced strength of a gravel runway (compared to a paved surface) can result in deflection of the surface under an imposed aircraft load, leading to an increase in rolling resistance. Additionally, a gravel runway is subject to the seasonal impact of freeze-thaw cycles, which further reduce strength of the runway surface. During acceleration for take-off, the distance to accelerate the aircraft to lift-off speed will be increased. This results in increased take-off distances and can result in increased accelerate-stop distances. These penalties, as defined in the Commercial Air Service Standard, require an additional 10% distance for small aircraft and 15% for large aircraft. The surface characteristics of an unpaved runway can also have adverse effects on the braking performance of the aircraft as well as steering. An unbound, loose surface will result in degraded braking performance compared to a paved hard surface. Brake anti-skid systems that are optimized for paved hard surfaces do not achieve the same performance on unbound gravel surfaces. This will also result in increased stopping distances during take-off and landing.

Temperatures in remote northern locations can reach as low as −70 F. Due to the cold climate, products that require the addition of water or that can freeze during storage are not viable options. Cold climates also prohibit the use of products that require evaporation to facilitate curing. Another challenge of applying stabilization or dust control agents in cold regions is the impact of maintenance and snow removal. When topically applied, the dust suppressant is concentrated in the upper 0.5-2" of the runway surface. The majority of the dust palliative can easily be removed or buried with one improper grading or snow removal.

There are several major challenges for operators of runways in cold, remote locations as a result of climate change. During winter months the aggregate and fines in a gravel runway are locked in place by winter freezing. This improves runway strength and allows the runway to service aircraft without restrictions. The duration of the winter freeze has declined from seven months to five months in recent years, greatly reducing the window of serviceability. In many locations, runway operators are removing the snowpack in order to prevent snow cover from insulating and thawing the surface. While this improves the strength of the runway when temperatures are sub-freezing, it can be detrimental when the surface thaws because of the loss of gravel and fines from grading operations.

US Publication No. 2021/0071002 to Meyer et al relates solely to oil-in-water emulsions, where water is the continuous phase, the cationic emulsifier must be water-soluble, and much more water-soluble than oil-soluble. Indeed, the ionic content of the "cationic" emulsifier strongly promotes solubility in water, and according to Bancroft's law, the emulsifier (whether ionic or nonionic) needs to be very soluble in the continuous phase to stabilize the emulsion. The fundamental distinction between the "cationic emulsifiers" of Meyers and the "organic amines" of the present teaching is that (even though they may both contain a secondary amine group in their molecular structure) they are two distinct types of molecules. Meyers' cationic emulsifiers (regardless of whether they contain secondary amines or not) are designed to be highly water-soluble and exhibit poor if any solubility in oil because water is an excellent solvent for ionic surfactants and their counterions and water is the continuous phase of the Meyers emulsions. Cationic means that the charge on the surfactant molecule itself is positive (+) and in the close proximity of that (+) charged portion of the surfactant will be a negatively (−) charged small counterion in solution in the water; that counterion must be present to balance the total charge. This is perfectly appropriate for the Meyers emulsions because the continuous phase is water. However, there is no water at all in the emulsion of the present teaching. It may form an anhydrous, polar oil-in-nonpolar oil (i.e., polyamide-in-isoalkane) emulsion. Therefore, one cannot use a secondary-amine containing cationic surfactant as described by Meyers in the present teaching because the Meyers cationic surfactants will not dissolve in the nonpolar isoalkane-based solvent of the present teaching. The emulsions of the present teaching can only employ oil-soluble "organic amines" such as alkylamines (that exhibit little if any solubility in water).

Further, there is a distinction between the functions of the cationic surfactants in Meyers and the organic amines in the present teaching. Meyers cationic surfactants (that can contain secondary amine groups) are intended to promote emulsification of oil droplets within water in an oil-in-water aqueous emulsion, therefore they are referred to as "cationic emulsifiers" in Meyers. However, the oil-soluble organic amines in the present teaching need not have any emulsion-promoting activity (for promoting the emulsification of the polyamide polar oil-in-nonpolar isoalkane oil non-aqueous emulsions of the present teaching) but only be selected for promoting adhesion. If one were to add "emulsifiers" noted in the present teaching to enhance the stability of the anhydrous emulsion, the appropriate emulsifiers would be oil-soluble long chained alcohols and oil-soluble fatty acids (not water-soluble cationic emulsifiers).

The only hydrocarbon solvents found in Meyers that are effective at sub-freezing temperatures are the aromatic solvents toluene and xylene. In both cases the polyamide-aromatic solvent mixture remains a transparent solution at −20° C. and −30° C. However, one aromatic solvent freezes (benzene). For the remaining aromatic solvents (aromatic naphtha, diesel (~25% aromatic content), and kerosene (~10% aromatic content), the polyamide precipitates out of solution and falls to the bottom of the mixture. Therefore, the aromatic solvents provide a "mixed bag" of subfreezing results (frozen solvent, polyamide precipitation, or a solution) that one cannot readily transfer to isoalkanes. Further, it is inappropriate to use aromatics as an analog for isoalkanes because isoalkanes have no aromatic content.

II. SUMMARY

The present teaching has several benefits over prior formulations of this composition. It contains an adhesion promoting compound that establishes the formation and increases the strength of chemical bonds between the fatty acid compounds in the product and constituents in the aggregate. The adhesion promoting compound enhances the strength and durability of the surface, leading to less frequent repairs and greater longevity of the installation. The key performance attributes of this installation are a bound surface with a tightly tethered matrix that is highly resistant to displacement, a tough and flexible surface that is reworkable and continuously active, and a surface with low maintenance requirements and extended critical service life. The characteristics of these adhesion promoting compounds provide improved mechanical properties in the product that lead to increased performance attributes, including: higher CBR values, greater stiffness and uniformity, improved resistance to moisture, reduction in seasonal soft-spots, increased resistance to freeze thaw damage, protection of underlying layers, void reduction, lower rolling resistance, improved braking, year round serviceability, minimized foreign object debris (FOD), and a uniform and consistent installation process.

One aspect of the present teaching is a dual mechanism approach in which an innovative installation technique is used in conjunction with a preservation agent to create a hard surface runway. The result is a runway specifically designed to improve safety, quality, resilience, performance, durability, and service life of the runway. This improves the efficiency and cost-effectiveness of repairs, treatment, maintenance, preservation, rehabilitation, reconstruction, and replacement of lost gravel on runways and other trafficked surfaces. This dual mechanism approach best fulfills the role of Federal, State, and Provincial Governments in improving runway infrastructure. These improvements have potential to provide profound social and economic benefits for remote locations, including reliable medivac operations and medical supply transfer, dependable transportation of resources, increased reliability for tourism related transportation, and ability to transport increased payloads.

The present teaching includes a synthetic isoalkane and a binder consisting essentially of a carboxylic acid, ester, or a thermoplastic polyolefin. This composition provides superior dust control, fines preservation, and stabilization, and creates a hard, smooth, durable gravel or aggregate surface to ensure rural aviation reliability, safety, and service. This results in higher aggregate density with fewer surface voids, loss of material, reduction of foreign object debris (FOD), reduced formation of potholes, rutting and wash boarding, and elimination of gravel float and segregation. This also results in improved air and water quality through reduction of airborne particulates and soil erosion. In addition, the present teaching can be applied neat, or undiluted, eliminating the chances of collateral runoff. The present teaching also remains active over long periods of time, requiring fewer maintenance applications. It is insoluble in water, resisting rain and inclement weather, and contains no electrolytes, thereby inhibiting corrosion.

Performance benefits of the present teaching include improved aircraft steering, braking performance, and lower rolling resistance, which result in lower penalties for aircraft take-off and landing. Additional benefits include protection of underlying runway layers, freeze-thaw stability, product stability at temperatures down to −70 F., year-round serviceability, elimination of soft spots, improved runway uniformity, and reduction of maintenance requirements. The impact of freeze and thaw cycles on the stability, strength, and integrity of the treated gravel surface are minimized because water cannot permeate below the surface where the freeze thaw cycle weakens these layers occurs.

The adhesion promoting compounds in this aspect act by migrating to the interface between the product and the aggregate where it permanently bonds with the aggregate and causes a chemical reaction as the product cures. The adhesion promoter acts as a chemical bridge between the aggregate and the organic fatty acid esters or polyolefins in the composition, creating an extremely durable yet flexible Scientifically Engineered and Constructed Unpaved Runway (SECUR) surface.

The adhesion promoting compounds in this aspect create an interphase region that is resistant to chemical attack from the environment. Adhesion promoters may consist of molecules with short organic chains that form primary bonds with both the aggregate and the organic fatty acid esters or polyolefins in the composition. These bonds provide resistance to water, salt, and adverse weather conditions. One aspect of the present teaching is a water-free, water-repellant formulation that can be used at sub-freezing temperature. Because there is no water, there is no water-rich phase into which one may dissolve polyacrylamide (PAM), which is a solid at ambient temperature ($T_{melt}$ of 84° C.). Neither can PAM dissolve in the carrier, plasticizer, or carboxylic acids of the present teaching.

A heterogeneous mixture is produced by blending aliphatic or cyclic organic compounds with carboxylic acids of chemical structure R—COOH and applied to gravel, aggregate and soils in a manner to produce high levels of dust control and stabilization, creating a surface with higher CBR strength, greater stiffness, water resistance, and void elimination. The aliphatic and cyclic compounds act as plasticizers and carriers for the carboxylic acids and adhesion promoter. When applied to gravel, aggregate and soil the carrier provides a mechanism for the carboxylic acid and adhesion promoter to penetrate the gravel, aggregate and soil and also acts as a dust suppressing weighting agent. The plasticized carboxylic acid provides a durable, reworkable binder that associates small particulates while stabilizing gravel, aggregate and soil. The adhesion promoting compound increases the formation and strength of chemical bonds between the aggregate and the carboxylic acids, increasing the strength and durability of the installed surface. The chemical agent is manufactured and applied using conventional mixing equipment.

The present teaching also encompasses a heterogeneous mixture produced by blending aliphatic or cyclic organic compounds with polyolefins of chemical structure $C_nH_{2n}$ or R—$C_{2n}H_{3n}$, and applied to gravel or aggregate or soils in a manner to produce high levels of dust control and soil stabilization, creating a hard and durable surface in areas of intense use. The aliphatic and cyclic compounds act as plasticizers and carriers for the polyolefin and adhesion promoter to penetrate the gravel, aggregate and soil and also acts as a dust suppressing weighting agent. The plasticized polyolefin provides a durable, reworkable binder that associates small particulates while stabilizing gravel, aggregate and soil. The adhesion promoting compound increases the formation and strength of chemical bonds between the aggregate and the polyolefin, increasing the strength and durability of the installed surface. The chemical agent is manufactured and applied using conventional mixing and applied using conventional construction equipment.

The present teaching is a proactive system engineered to produce an irreversibly bound surface layer capable of preserving the as-constructed condition of a runway for much longer than achieved under current practices. The compound, instead of being topically applied, can be installed into the upper layer of the existing runway surface during the reconstruction/rehabilitation of unpaved runways or other trafficked surfaces. This is realized by locking the gravel and fines in place via a binder system. By securing the gravel and fines to the surface, harmful dust, loose aggregate and FOD are reduced and even eliminated.

Still other benefits and advantages of the present subject matter will become apparent to those skilled in the art to which it pertains upon a reading and understanding of the following detailed specification.

III. BRIEF DESCRIPTION OF THE DRAWINGS

The present teachings are described hereinafter with reference to the accompanying drawings.

IV. DESCRIPTION

The present teaching described herein consists of aliphatic and cyclic organic compounds utilized as plasticizers and carriers that are blended with materials composed primarily of carboxylic acids and an adhesion promoter and applied in a manner to produce improved levels of dust and erosion control, and soil stabilization.

A novel and unexpected result occurs when carboxylic acids are blended with aliphatic or cyclic organic plasticizers and carriers. These blends are processed into either heterogeneous mixtures or water-free emulsions that when applied to soil, gravel, aggregate, or minerals provide high levels of long lasting dust control and stabilization. The present teaching exhibits tremendous moisture resistance, re-workability, and working life, while being non-corrosive and non-hazardous. The addition of adhesion promoters enhances the chemical reactivity of the carboxylic acids, improving bond strength and resistance to degradation.

Aliphatic organic compounds refer to saturated and unsaturated hydrocarbons derived from petroleum, coal, biomass, or Fischer Tropsch or synthetic manufacturing including paraffins or alkanes, isoparaffins or isoalkanes, olefins, alkenes, and alkadienes, alcohols, ethers, aldehydes, ketones, carboxylic acids, estolides, and carbohydrates. The composition comprises 0-95% by weight of these compounds.

Cyclic organic compounds refer to alicyclic hydrocarbons, cycloparaffins, cyclo-isoparaffins, cyclo-olefins, cyclo-acetylenes, aromatic hydrocarbons, heterocyclics, and any combinations of aliphatic and cyclic structures such as terpenes, amino acids, proteins, and nucleic acids. The composition comprises 0-95% by weight of these compounds.

Carboxylic acid refers to any substance whose major constituents are saturated or unsaturated fatty acids and their esters derived from animal or vegetable fat or oil; and vegetable derived resins or rosin acids, all represented chemically R—COOH. The composition comprises 5-70% by weight of these substances.

Plasticizer refers to organic compounds added to carboxylic acids and adhesion promoter to facilitate processing and increase the flexibility and durability of the final product.

Carrier refers to any organic compounds in which carboxylic acids and adhesion promoter are miscible in and serve as a vehicle to aid in the dispersion and penetration of plasticized carboxylic acids into the gravel, aggregate, and soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. Emulsifiers can be protein or carbohydrate polymers or long-chained alcohols and fatty acids. The water-free emulsions can either be polar oil-in-nonpolar oil or nonpolar oil-in-polar oil.

Figure 1:
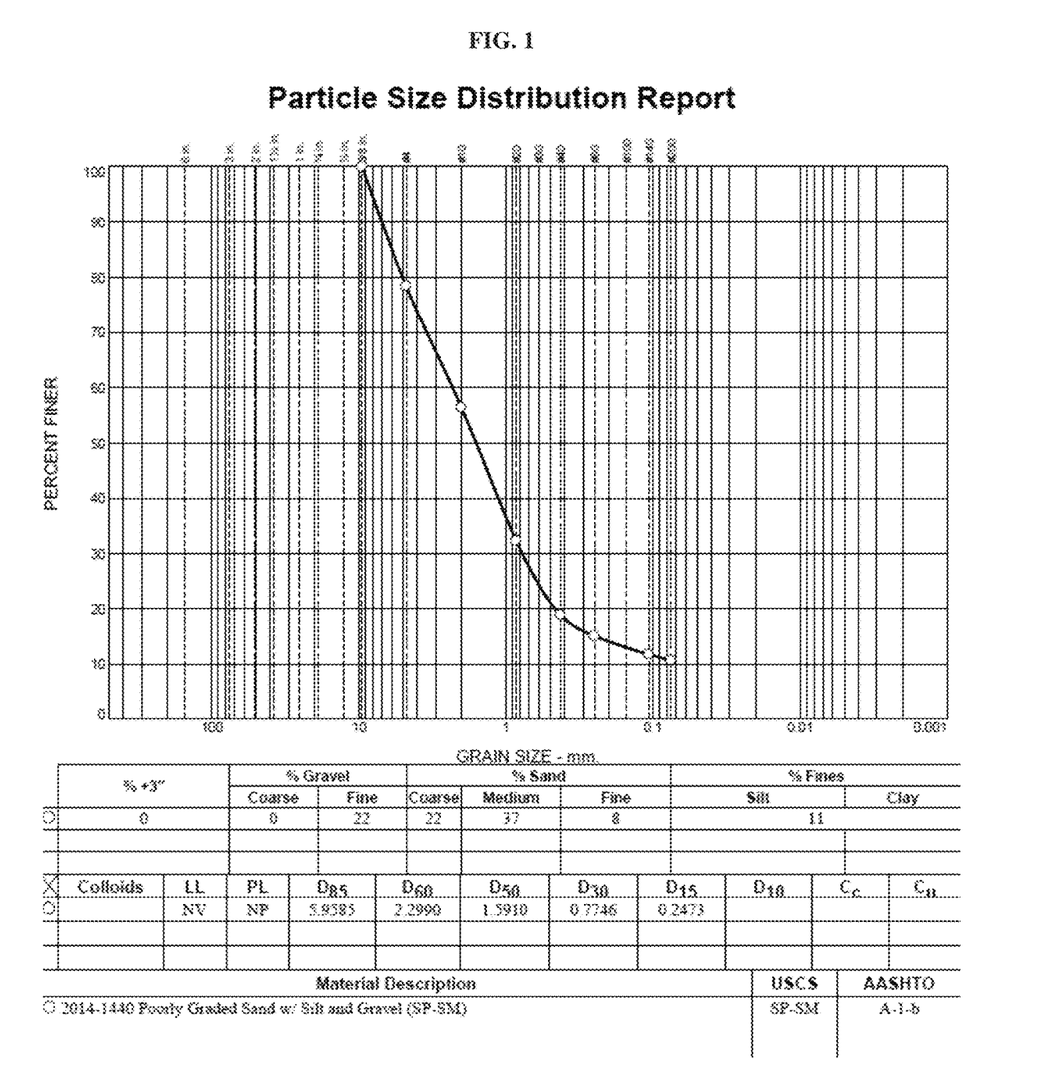
FIG. 1 is a particle size distribution curve from a CBR test conducted on aggregate.
Figure 2:
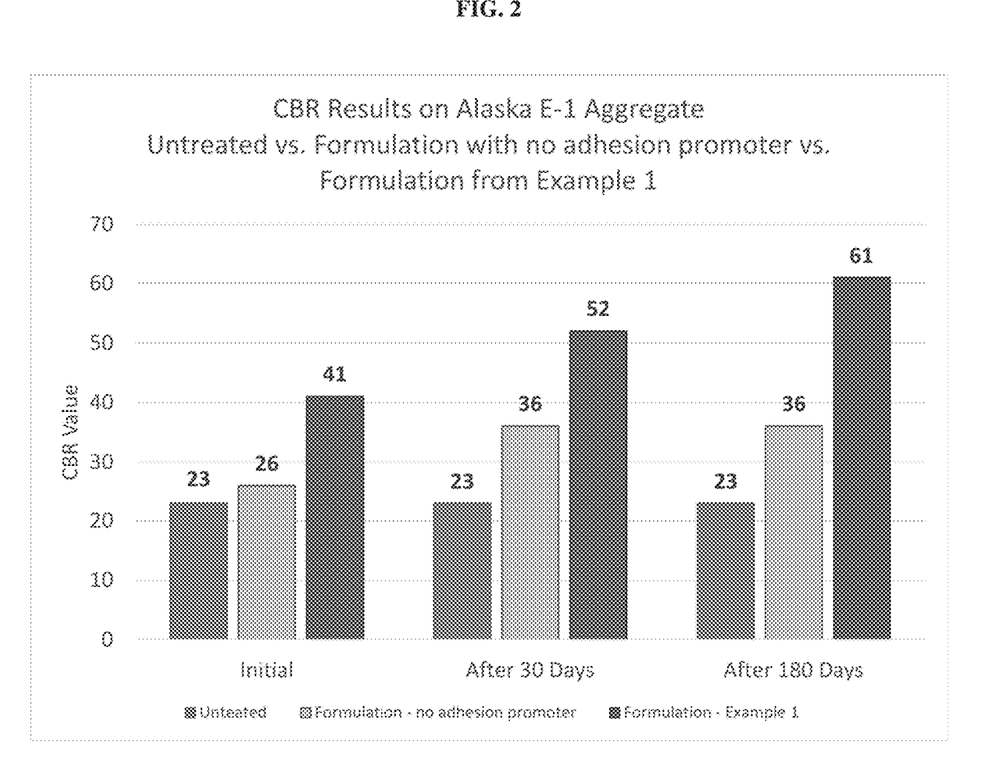
FIG. 2 shows the surface CBR value over time for an unpaved surface that has not been treated, an unpaved surface treated with a formulation containing no adhesion promoter, and the formulation with an adhesion promoting compound.
Figure 3A:
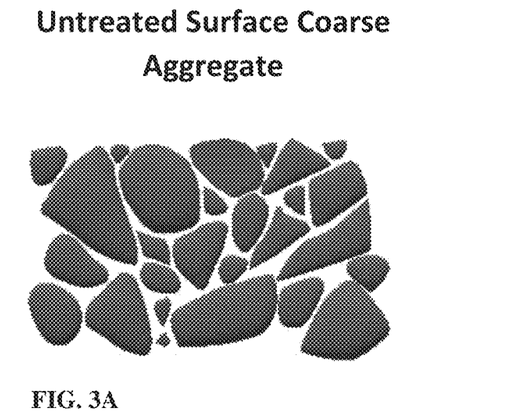
FIGS. 3A-3F show life cycle performance of aggregate.
Figure 3B:
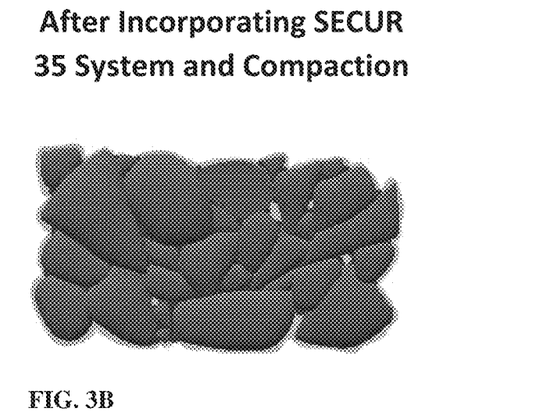

Adhesion promoting compounds or adhesion promoters refers to any compound added to the formulation to improve aggregate coating and increase the strength and frequency of chemical bonding between the formulation and aggregate. FIG. 3A shows untreated surface coarse aggregate. FIG. 3B represents the aggregate after the composition is applied and incorporated into the aggregate surface course, allowing for a uniform coating of every particle. Immediately upon contact, the composition physically adheres to every particle and the chemical adhesion process begins. After compaction to 7% or less air voids, the composition is physically and chemically adhered to every particle. In addition to the natural particle interlock and friction, cohesion and chemical bonding between aggregate particles is increased, thereby locking every particle into a bound matrix.

Figure 3C:
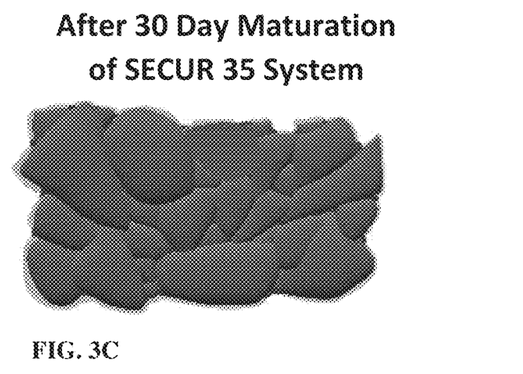

With reference to FIG. 3C, after thirty days, routine compaction and traffic loading further tightens the runway surface. The chemical reaction and bonding process begins after application and after a 180-day maturation period, the process is complete. The preservation agent has irreversibly transformed from a liquid to an insoluble solid, which cannot be displaced or leached from the particles. This creates a hard, bound surface runway that resists surface deterioration and moisture infiltration.

Figure 3D:
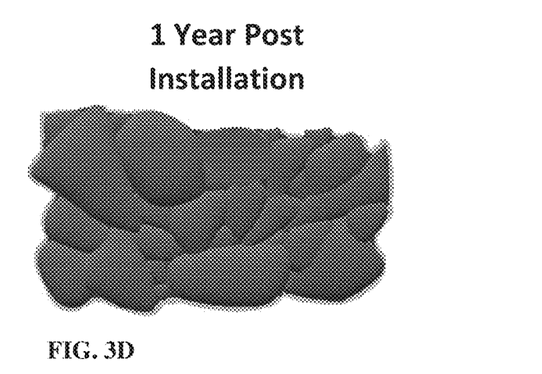

With reference to FIG. 3D, the composition continues to maintain the as-constructed condition of the runway through the first year of service. The tightly bound surface is mostly void of loose gravel and surface deterioration. Precipitation is shed from the runway surface allowing it to hold up through freeze/thaw cycles. The composition continues to suppress dust emissions by over 85%.

Figure 3E:
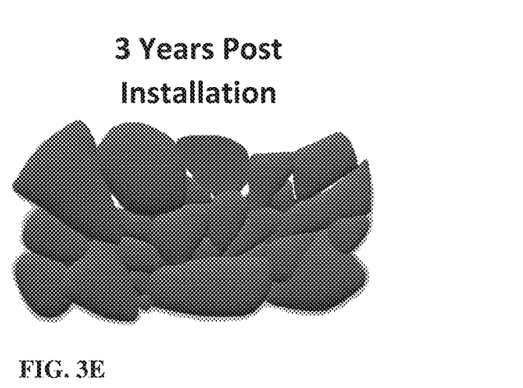

With reference to FIG. 3E, after about three years, the runway surface will begin to show early signs of deterioration. Some of the smaller particles become dislodged and removed as the topcoat is worn down from traffic abrasion. Overall, the runway is performing very well with minimal loose particles present on the surface. The runway remains densely compacted but could benefit from a recommended maintenance topical application to bind all loose surface particles, rejuvenate the ground inventory, and eliminate dust emissions.

Figure 3F:
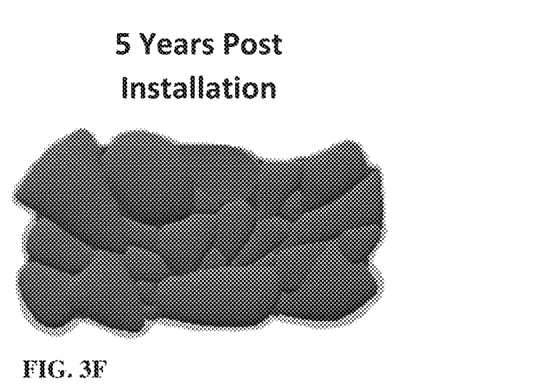

With reference to FIG. 3F, a rejuvenating topcoat is topically applied between 3-5 years post application based on specific runway conditions to bind all loose surface particles and revitalize the performance. After the topcoat is applied, compaction is recommended to embed any loose aggregate and maintain a densely bound, hard surface. Five years after the installation the runway has lost minimal aggregate and requires very little maintenance.

Figure 4:
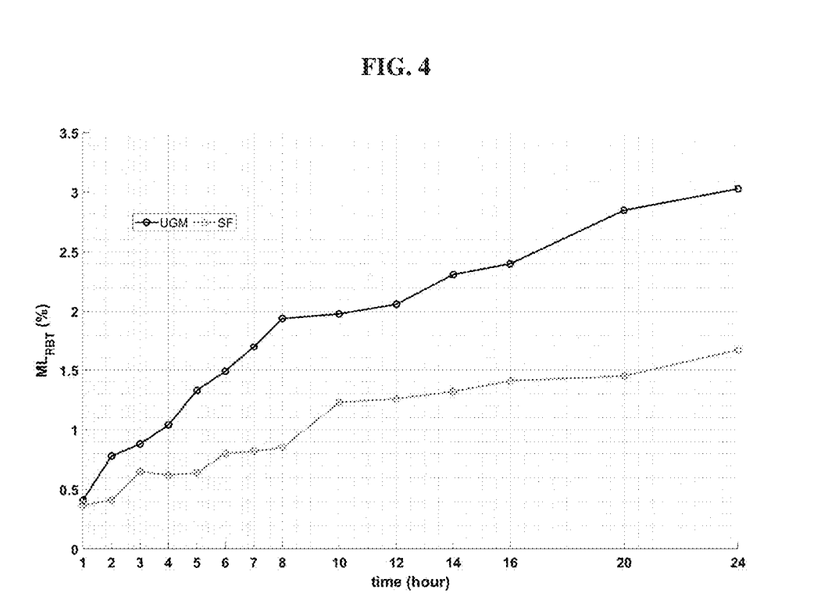
FIG. 4 shows the mass loss in the Rolling Bottle Test ($ML_{RBT}$) for each tested time interval for uncoated aggregate and aggregate coated with the formulation containing adhesion promoter.
Figure 5:
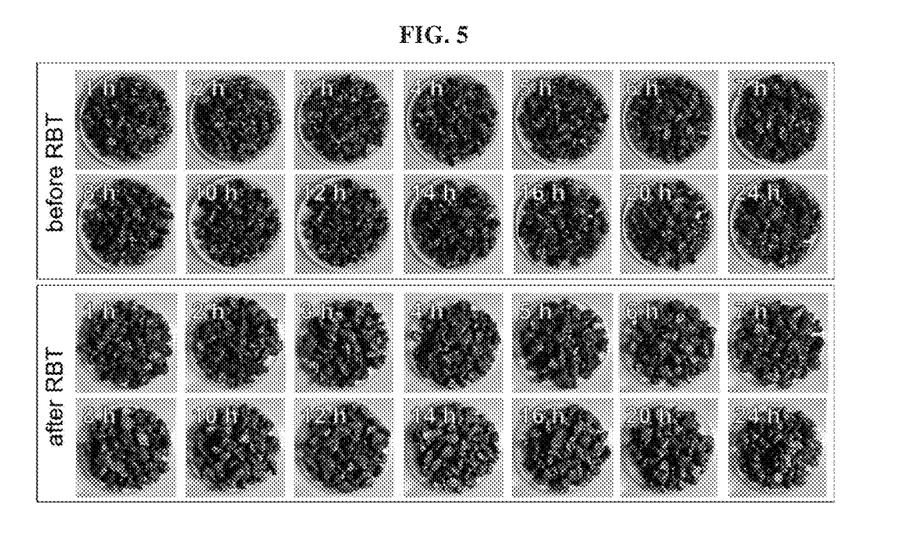
FIG. 5 shows fourteen Rolling Bottle Test (RBT) samples tested based on various rotating time intervals.

With reference to FIGS. 4 and 5, susceptibility to stripping, as determined by the Rolling Bottle Test method, is an indirect measure of the power of a binder to adhere to various aggregates, or of various binders to adhere to a given aggregate. The procedure can also be used to evaluate the effect of moisture on a given aggregate-binder combination with or without adhesion promoting compounds including liquids, such as amines, and fillers, such as hydrated lime or cement. In the rolling bottle method, the affinity is expressed by visual registration of the degree of product coverage on uncompacted mineral aggregate particles after influence of mechanical stirring action in the presence of water. Test results show a smaller amount of mass is lost for aggregate treated with the formulation containing an adhesion promoting compound.

California Bearing Ratio (CBR) refers to a measure of the load bearing capacity of a given sample of gravel, aggregate and soil expressed as a ratio relative to the load bearing capacity of crushed limestone. The surface shear strength of an unpaved runway is expressed as a CBR value. The bearing strength of crushed limestone has been adopted as one of the criteria to which other types of gravel, aggregate, and soil, are compared. Limestone has a CBR value of 100, which is expressed as CBR 100. A gravel, aggregate, and soil with a CBR of 10 has 10% of the bearing strength of crushed limestone.

Foreign Object Debris (FOD) refers to any foreign object that does not belong on the runway, taxiway, or ramp area including broken pavement and loose stones. FOD can be ingested in an aircraft engine, which can result in damage to the aircraft or cause an accident.

Optimum moisture content refers to the water content at which a gravel, aggregate or soil can be compacted to the maximum dry unit weight by a given compactive effort.

Fines refer to fine grained soils which are soil particles having a diameter of less than 75 microns. Fines are divided into two categories: silt and clay. Soil particles with a diameter range of 75 microns to 2 microns are referred to as silt. Soil particles smaller than 2 micron are referred to as clay.

The present teaching is manufactured using conventional manufacturing equipment. Conventional mixers, emulsifiers, or colloid mills are utilized to blend these components into stable heterogeneous mixers or water-free emulsions.

Once applied the liquid penetrates into the gravel, aggregate, or soil for dust control, fines preservation, and stabilization. A particle weighting and loading mechanism is achieved through adsorption and adherence of molecules to the surface of the particles. Also, the liquid absorbs and penetrates into the inner structure of the particles.

By incorporating and installing the present teachings, the preservation agent is evenly distributed throughout the entire installation, resulting in increased CBR strength of the whole layer. More uniform distribution allows for optimal coating of particles which when reacted with the aggregate creates a more durable and stronger bound surface. This is proven in laboratory testing shown below which demonstrates a CBR increase of over 100% after the 30-day maturation when using the present teachings with runway surfacing aggregate.

Surface aggregate is installed at a recommended particle size distribution, but without proper preservation and stabilization the aggregate loses its fines through dust emissions, abrasion, runoff, and jet/prop blasts. The fines act as a natural glue and maintain maximum compaction, interparticle friction, and reducing moisture infiltration. As they are removed by aircraft traffic and erosion, the surface begins to destabilize resulting in a loose surface prone to further deterioration. Loose surfaces can result in costly aircraft damage and increased risk of pilot and passenger safety due to Foreign Object Debris. This is a major issue for most unpaved runways and other trafficked surfaces that the applicant has assessed in the last 10 years. The present teaching is engineered and constructed to proactively protect the runway surface from becoming loose and deteriorating after repeated exposure to aircraft movements. This is achieved by keeping the aggregate and fines locked into the surface course using adhesion, cohesion, and chemical bonding. The binder component reduces surface erosion and dust emissions generated from simulated aircraft movements up to 96%. This extends the service life, reduces maintenance, delays costly overlays, and keeps the runway in safe operable condition. Aggregate with low fines has grain to grain contact, low stability unless confined, is permeable, difficult to obtain uniform compaction, and generates excess float. On the other hand, aggregate with proper fines has good strength, good stability, good performance, requires some compactive effort, and is resistant to abrasion and moisture infiltration.

In one aspect of the present teaching, after the runway base has been installed and any weak spots have been remediated, the crushed aggregate surface course is uniformly spread to the proper depth in accordance with the design specifications. The crushed aggregate course can be profiled with a 2 to 2.5% crown which extends from the centerline of the runway to each shoulder. Water is then added to the newly placed crushed aggregate until the material is at an optimum moisture content, as determined by laboratory proctor testing. About 40% of the recommended composition is applied to the crushed gravel surface using a sprayer. A grader is then used to windrow the upper two to three inches of the treated aggregate to each side of the runway. Then an additional 40% of the composition can be added to the runway surface, although in one aspect, this is not applied to the windrowed two inches of treated aggregate. Again, use a grader to windrow the recently treated upper two to three inches of aggregate to each side of the runway. Then the grader is used to grade the treated windrowed aggregate back on to the runway. Once the treated surface aggregate is at or near optimum moisture content, the treated surface layer is compacted to between about 95% to about 98% density. After the treated surface layer is compacted, the remaining about 20% of composition is topically applied to the compacted surface. Compaction can be applied over the next several days to create a tightly bound, pavement-like surface.

In another aspect of the present teaching, a reclaimer can be used to reclaim about four to six inches of a runway, and 80% of the composition can be applied in one pass, with the remaining 20% being used as a seal coat.

EXAMPLES

Example 1

This example discloses a formulation for producing a heterogeneous mixture depicted in the present teaching.

| | Constituent | Trade Name | Manufacturer | Weight % |
|---|---|---|---|---|
| 1. | Synthetic iso-alkanes | DSF-65 ™ | Petro-Canada | 62% |
| 2. | Mixture of chain and tricyclic organic chemical acids and esters of sterols and fatty acids | RTOP ™ | Arboris | 35% |
| 3. | Fatty acid amine derivative | Indulin ® R20 | Ingevity | 3% |

The Arboris material is maintained at 45-135 degrees centigrade and blended into the remaining materials using conventional blending equipment or agitation.

Example 2

This example discloses a formulation for producing a heterogeneous mixture depicted in the present teaching.

| | Constituent | Trade Name | Manufacturer | Weight % |
|---|---|---|---|---|
| 1. | Synthetic iso-alkanes | DSF-65 ™ | Petro-Canada | 63% |
| 2. | Mixture of chain and tricyclic organic chemical acids and esters of sterols and fatty acids | RTOP ™ | Arboris | 35% |
| 3. | High molecular weight block copolymer | BYK ® 4500 | BYK USA, Inc. | 2% |

The Arboris material is maintained at 45-135 degrees centigrade and blended into the remaining materials using conventional blending equipment or agitation.

The present teaching described herein consists of aliphatic and cyclic organic compounds utilized as plasticizers and carriers that are blended with materials composed primarily of thermoplastic polyolefin compounds and an adhesion promoter and applied in a manner to produce improved levels of dust and erosion control, and gravel, aggregate and soil stabilization.

A novel and unexpected result occurs when thermoplastic polyolefin compounds are blended with aliphatic or cyclic organic plasticizers and carriers. These blends are processed into either heterogeneous mixtures or water-free emulsions that when applied to soil, gravel, aggregate, or minerals provide high levels of long lasting dust control and stabilization. The present teaching exhibits tremendous moisture resistance, re-workability, and working life, while being non-corrosive and non-hazardous. The addition of adhesion promoters enhances the binding activity of the thermoplastic polyolefin compounds, improving bond strength and resistance to degradation.

Aliphatic organic compounds refer to saturated and unsaturated hydrocarbons derived from petroleum, coal, Fischer Tropsch, or synthetic manufacturing including paraffins or alkanes, isoparaffins or isoalkanes, olefins, alkenes, estolides, and alkadienes, alcohols, ethers, aldehydes, ketones, carboxylic acids, and carbohydrates. The composition comprises 0-95% by weight of these compounds.

Cyclic organic compounds refer to alicyclic hydrocarbons, cycloparaffins, cyclo-isoparaffins, cyclo-olefins, cyclo-acetylenes, aromatic hydrocarbons, heterocyclics, and any combinations of aliphatic and cyclic structures such as terpenes, amino acids, proteins, and nucleic acids. The composition comprises 0-95% by weight of these compounds.

Thermoplastic polyolefin compound refers to any substance derived from olefins with chemical structure $C_nH_{2n}$ or $R-C_{2n}H_{3n}$, including polyethylene, polypropylene, polybutenes, polyisobutylenes, polyisoprene, and their copolymers. The composition comprises 2-90% by weight of these substances.

Plasticizer refers to organic compounds added to carboxylic acids and adhesion promoter to facilitate processing and increase the flexibility and durability of the final product.

Carrier refers to any organic compounds in which carboxylic acids and adhesion promoter are miscible in and serve as a vehicle to aid in the dispersion and penetration of plasticized carboxylic acids into the gravel, aggregate, or soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. The water-free emulsions can either be polar oil-in-nonpolar oil or nonpolar oil-in-polar oil. The carrier and carboxylic acid mixture (or the plasticizer and carboxylic acid) may form a heterogeneous mixture when mixed (this two-liquid-phase behavior would most commonly occur at lower temperatures). Cloudiness indicates that two phases are present because the conditions are such that the components are partially miscible, but not completely miscible, therefore leading to the formation of two liquid phases. However, in the present teaching, both phases are organic; no water is present. The carrier is a non-polar organic liquid, and the carboxylic acid is an organic liquid with a non-polar "tail" of an alkyl group connected to a polar head group of a carboxylic acid. If the oil is the predominant phase and if an oil soluble surfactant or emulsifier is added, then the carboxylic acid molecules themselves can assemble into emulsions where the droplets of carboxylic acid aggregate in the interior of the emulsion, while the non-polar alkyl tails point outward toward, and into, the non-polar carrier. This is called a "reverse emulsion" or a "polar organic carboxylic acid-in-nonpolar organic carrier emulsion." Alternately, if the carboxylic acid is the predominant component, then the emulsion is described as a "nonpolar carrier-in-polar carboxylic acid emulsion."

Adhesion promoting compounds or adhesion promoters refers to any compound added to the formulation to improve aggregate coating and increase the strength and frequency of chemical bonding between the formulation and aggregate. The adhesion promoting compound can be chosen from organic amines, amides, polyamides, borates, imidazoline amides, amide esters, aminoesters, copolymers with amine based functional groups, silanes, organosilanes, or siloxanes. One example of a silane adhesion promoting compound is γ-glycidoxypropyltrimethoxysilane, available from Dow Chemical as Xiameter™.

In polyamides, there are relatively few —NHCO— amide groups in the backbone compared to the number of hydrogenated carbons —(CH$_2$)— in the backbone. The hydrocarbon segments composed of multiple —CH$_2$— groups are very oil-philic and hydrophobic; they promote dissolution in oils. The polar amides in the polyamide backbone are not as easily accessed by the surrounding solvent. Therefore, the presence of the numerous oil-philic —CH$_2$— groups in the polyamide backbone can cause the polyamide to exhibit oil-solubility and water-insolubility, even though there are also amides in the backbone. This stands in stark contrast to the remarkable water-solubility of polyacrylamide, which has a high frequency of easily accessible pendent amides dangling off of the polymer backbone. This is the main reason that polyamides (rather than polyacrylamide) are used when preparing solutions with a non-aqueous (i.e. water-free) oil-based solvent; polyacrylamide cannot dissolve in oils, but polyamides can dissolve in oil. Polyacrylamide will not dissolve in the carboxylic acid-isoalkane blend of the present teaching. Polyacrylamide is one of the most commonly cited water-soluble polymers, but it is oil-insoluble. The composition of the present teaching is not water-based but is based on a mixture of water-insoluble isoalkanes and water-insoluble carboxylic acids that are miscible with isoalkanes.

Once applied, the liquid penetrates into the gravel, aggregate, or soil where two mechanisms for dust control, fines preservation, and stabilization contribute to the effect. The first is a particle weighting and loading mechanism achieved through the processes of absorption, adherence of molecules to the surface of particles and absorption, penetration of the substance into the inner structure of the particles.

The second mechanism is produced by the plasticized polymeric polyolefin compounds which act as binders. The thermoplastic polyolefin compounds bind particles into a tightly cohesive base when subjected to compactive forces. The plasticized polyolefin compounds remain active even through severe wet weather and mechanical disturbances from heavy tracked vehicles and steel-chained tires. The present teaching displays a unique and unexpected ability to be recompacted into a tightly associated base when disturbed, dramatically extending the working life of the chemical agents.

Example 3

This example discloses a formulation for producing a heterogeneous mixture as disclosed in the present teaching.

| | Constituent | Trade Name | Manufacturer | Weight % |
|---|---|---|---|---|
| 1. | Synthetic iso-alkanes | DSF-65 ™ | Petro-Canada | 64% |
| 2. | Polyisobutylene | TPC ™ 1160 | TPC, Inc. | 33% |
| 3. | Fatty acid amine derivative | Indulin ® R20 | Ingevity | 3% |

The TPC™ 1160 material is maintained at 45-135 degrees centigrade and blended into the remaining materials using conventional blending equipment or agitation.

DSF 65 is a mixture of saturated hydrocarbons, and does not contain aromatic groups, double bonds, or triple bonds. DSF-65 has a carbon range of C16-C31, with over 80% being in the C16-C25 range, with the average number of carbons being 21 or 22. DSF-65 has no aromatic content and no unsaturated content. DSF 65 contains some normal alkanes (linear alkanes with no methyl branches), but it is primarily a mixture of saturated mono-methyl, di-methyl, and tri-methyl branched alkanes. The average degree of methylation for the entire DSF 65 would be in the 1.77-2.58 range. DSF-65 is comprised of 10-30% mono-methyl acyclic aliphatic compounds, 10-50% di-methyl acyclic aliphatic compounds, and 5-30% tri-methyl acyclic aliphatic compounds.

Example 4

This example discloses a formulation as disclosed in the present teaching.

| | % Product Lost After 24 hrs | |
|---|---|---|
| Sample # | Small Test | Large Test |
| EK35 + 2% Toximul TA2 | 8.22% | 18.12% |

-continued

| | | |
|---|---|---|
| EK35 + 2% Cocoamide DEA | 8.33% | 11.42% |
| EK35 + 2% Xiameter OFS-6040 | 5.19% | 8.30% |
| EK35 | 11.81% | 9.21% |
| Untreated | 0.10% | NA |

| Sample # | % Product Lost After 24 hrs Large Test |
|---|---|
| EK35 + 2% Xiameter OFS-6040 | 6.13% |
| EK35 | 7.00% |

EK35® is a synthetic fluid/binder composition available from Midwest Industrial Supply. Toximul® is a tallow amine ethoxylate available from Stepan. Cocamide DEA, or cocamide diethanolamine, is a diethanolamide made by reacting the mixture of fatty acids from coconut oils with diethanolamine.

The non-aqueous (i.e., anhydrous, water-free) formulation of the present teaching is not subject to freezing of water at 0° C. because it contains no water. The use of the term "emulsion" is in reference to the state of the non-aqueous mixture of the constituents of their blend (none of which is water). The emulsions can be considered as a non-polar oil phase (isoalkanes) emulsified with a polar oil phase (polyamide), wherein the continuous, nonpolar oil, non-aqueous, isoalkane-rich phase can remain liquid well below 0° C. At sub-freezing temperatures (<0° C.) the heterogeneous mixture or emulsion appears uniform throughout the entire mixture (i.e., it does not segregate into two layered phases) and is hazy; the haziness is indicative of tiny droplets of one phase (typically the polar polyamide-rich oil phase) suspended within a continuous second phase (typically the nonpolar isoalkane-rich oil phase). Isoalkanes are designed to retain fluidity (liquid-like behavior) at temperatures well below 0° C. For example, the pour point of typical isoalkane blends is about −39° C. (the pour point of a multiple component blend is analogous to the distinct freezing point of a pure compound). Therefore, the formulation can be used at temperatures as low as −39° C. Even lower temperatures than −39° C. could be considered because of the use of a pour point depressant.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the present teachings, it is now claimed:

1. A compound for chemical gravel, aggregate, and soil stabilization, as-constructed preservation, erosion control, smooth hard surface creation, fines preservation, and dust control, the compound comprising:
   a binder comprising:
      a carboxylic acid, an ester, or a thermoplastic polyolefin;
   a synthetic isoalkane; and
   an adhesion promoting compound, wherein the adhesion promoting compound is selected from a group consisting of borates, imidazoline amides, and amide esters, wherein the compound is devoid of water.

2. The compound of claim 1, wherein the adhesion promoting compound is an amide ester.

3. The compound of claim 1, wherein the binder is the carboxylic acid, wherein the carboxylic acid is a fatty acid, wherein the compound is devoid of electrolytes.

4. The compound of claim 3, wherein the compound further comprises a non-aqueous emulsifier.

5. The compound of claim 4, wherein the emulsion has as a non-polar oil, non-aqueous, isoalkane-rich phase emulsified with a polar oil phase, wherein the continuous, nonpolar oil, non-aqueous, isoalkane-rich phase can remain liquid below 0° C.

6. The compound of claim 5, wherein the polar oil phase is a polyamide, wherein the adhesion promoting compound is a γ-glycidoxypropyltrimethoxysilane.

7. The compound of claim 3, wherein the synthetic isoalkane is selected from a group produced from hydrotreating, hydrocracking, or hydroisomerization, wherein the synthetic isoalkane has a viscosity of at least about 9 centistokes at 20° C., a flame point greater than 130° C., and a flash point of 177° C.

8. The compound of claim 1, wherein the adhesion promoting compound is a borate.

9. The compound of claim 1, wherein the adhesion promoting compound is an imidazoline amide.

10. An unpaved surface comprising:
    soil;
    gravel aggregate;
    a binder comprising:
       a carboxylic acid, an ester, or a thermoplastic polyolefin;
    a synthetic isoalkane; and
    an adhesion promoting compound, wherein the binder, synthetic isoalkane, and adhesion promoting compound are mixed with the soil and gravel aggregate to form the unpaved surface, wherein the unpaved surface contains no asphalt, wherein the adhesion promoting compound is selected from a group consisting of borates, imidazoline amides, and amide esters, wherein the mixture of the binder, synthetic isoalkane, and adhesion promoting compound are devoid of water.

11. The surface of claim 10, wherein the adhesion promoting compound is a borate.

12. The surface of claim 10, wherein the adhesion promoting compound is an imidazoline amide.

13. The surface of claim 10 wherein the adhesion promoting compound is an amide ester.

14. The surface of claim 10, wherein the binder is a carboxylic acid, wherein the compound is devoid of electrolytes, wherein the compound further comprises a non-aqueous emulsifier, wherein the synthetic isoalkane is selected from a group produced from hydrotreating, hydrocracking, or hydroisomerization, wherein the compound further comprises a non-aqueous emulsifier.

15. The surface of claim 14, wherein the emulsion has as a non-polar oil, non-aqueous, isoalkane-rich phase emulsified with a polar oil phase, wherein the continuous, nonpolar oil, non-aqueous, isoalkane-rich phase can remain liquid below 0° C., wherein the polar oil phase is a polyamide, wherein the adhesion promoting compound is a γ-glycidoxypropyltrimethoxysilane.

* * * * *